Aug. 21, 1956 — C. R. HENRICI — 2,760,190
PHASE ANGLE DISTANCE MEASURING SYSTEM
Filed Feb. 1, 1952 — 2 Sheets-Sheet 1

INVENTOR.
CARL R. HENRICI
BY
ATTORNEY

Aug. 21, 1956 C. R. HENRICI 2,760,190
PHASE ANGLE DISTANCE MEASURING SYSTEM
Filed Feb. 1, 1952 2 Sheets-Sheet 2

INVENTOR.
CARL R. HENRICI
BY
Marvin Moody
ATTORNEY

United States Patent Office 2,760,190
Patented Aug. 21, 1956

2,760,190

PHASE ANGLE DISTANCE MEASURING SYSTEM

Carl R. Henrici, Cedar Rapids, Iowa, assignor to Collins Radio Company, Cedar Rapids, Iowa, a corporation of Iowa Application February 1, 1952, Serial No. 269,566

3 Claims. (Cl. 343—106)

This invention relates in general to distance measuring apparatus and in particular to means for measuring very small phase angles which are proportional to distance.

In navigation it is oftentimes desirable to determine the distance from a fixed point so that a fix may be obtained. The present invention proposes to measure distance by utilizing the standard Civil Aeronautics Authority omni-range installations. Such installations comprise a transmitter which radiates essentially two basic field patterns. One of these is a uniform radial pattern amplitude modulated with 10 kilocycles and further frequency modulated at 30 cycles per second. The other is a rotating field which in effect yields a 30 cycle amplitude modulation. The relative phase between the amplitude modulation and frequency modulation recovered 30 cycle outputs is a measure of the line of position angle. Stated otherwise, the interaction of the two fields gives different phase angles for aircraft located at different angles relative to the transmitter.

It is an object of this invention to establish a base line between two receiving points on a moving body and measure the phase angle between the energy received at the points so as to solve for the distance to the transmitter by utilizing the Law of Sines.

Another object of this invention is to provide a distance measuring system wherein a pair of antennae are mounted on opposite ends of an aircraft and phase angle measuring means receive inputs from the two antennae to compute the distance from the transmitter.

Further features, objects and advantages of this invention will become apparent from the following description and claims when read in view of the drawings, in which;

Figure 1:
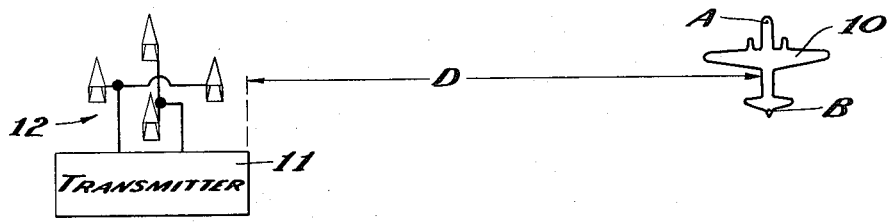
Figure 1 illustrates the problem to be solved.

Figure 1 illustrates an aircraft 10 which is located at some unknown position. A transmitter 11 is located a distance "D" from the aircraft and supplies radiant energy to an antenna network, designated generally as 12. As previously explained the transmitter and antenna 11 may be the standard Civil Aeronautics Authority omni-range installation which radiates a rotating field pattern and an omni-direction pattern. From such an installation the angle of the aircraft relative to the station may be obtained in a well known manner. The pilot of an aircraft may pick a particular approach angle and follow it into the station. Alternatively, a line of position can be obtained from the station and used for navigational purposes. However, in both of these cases, the distance "D" from the station is not known.

The present invention provides for mounting a pair of antennae A and B at opposite ends of the aircraft 10. The small angle whose legs terminate at the antennae A and B and has a vertex at the antenna 12 is measured by suitable electronic equipment on the plane. This is possible because of the ability of an antenna located at any point about the transmitter to obtain a bearing relative to the transmitter.

In measuring the distance, the 30 cycle outputs of the receivers are derived only from the rotating field. The omni-directional signal (10 kc. with 30 cycle FM) is not utilized for the phase comparison.

Figure 2:
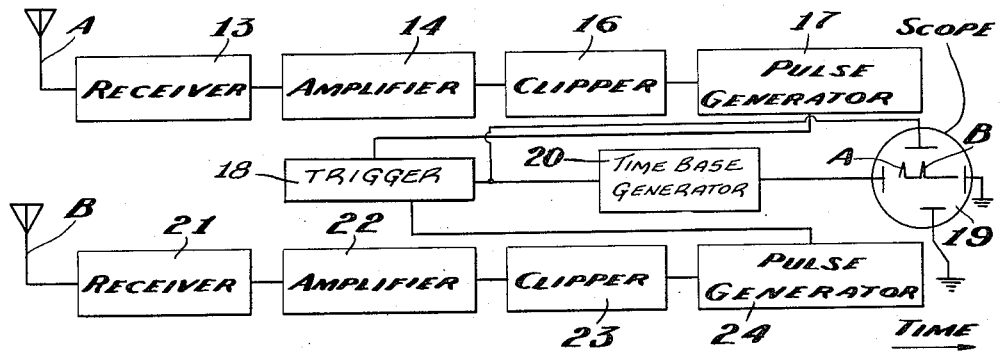
Figure 2 illustrates the electrical circuity required to solve the problem.

Figure 2 illustrates the electronic equipment required to measure this small angle. The antenna A is connected to a radio receiver 13. The output of the receiver is supplied to amplifier 14. A clipper 16 receives the output of amplifier 14 which is a 30 cycle sine wave and clips at a predetermined amplitude as, for example, on the upgoing positive half cycle.

A pulse generator 17 receives the clipped wave from the clipper 16 and supplies a triggering impulse to a trigger generator 18 which is connected to an oscilloscope 19. Oscilloscope 19 may be of a conventional type which has a time sweep potential such as a sawtooth wave, that provides the horizontal trace in a conventional manner. Accordingly, a time base generator 20 might provide a sawtooth waveform which is synchronized with the 30 cycles per second repetition rate of the trigger output pulses from trigger 18. The output pulses from trigger 18 are also applied to the vertical deflecting plate and therefore the presentation shown in Figure 6c is produced upon the oscilloscope screen.

The antenna B is connected to a similar circuit comprising a receiver 21, an amplifier 22, a clipper 23 and a pulse generator 24.

Figure 6:
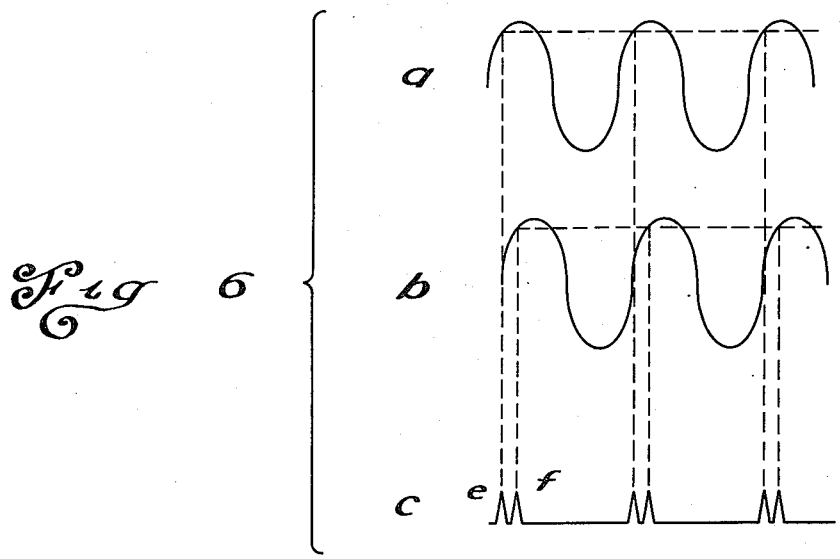
Figure 6 illustrates wave forms present in the invention.

Pips A and B appearing on the oscilloscope 19 are displaced on a time axis an amount proportional to the angle between A and B relative to the transmitter. Figure 6 illustrates the incoming waves received from antennas A and B. It is to be realized that the main problem in distance measuring systems of the present type is to measure the extremely small angle between a pair of sine waves. None of the conventional phase detectors are capable of measuring angles as small as hundredths of degrees and for this reason applicant measures the phase angle between the incoming waves shown in Figures A and B by passing them through clippers 16 and 23 which clip near the peaks of the waves and by producing sharp pulses $e$ and $f$ from each of the clipped waves in the pulse generators 17 and 24. These outputs are supplied to the trigger 18 that produces trigger pulses on the oscilloscope spaced an amount proportional to the distance D.

Figure 3:
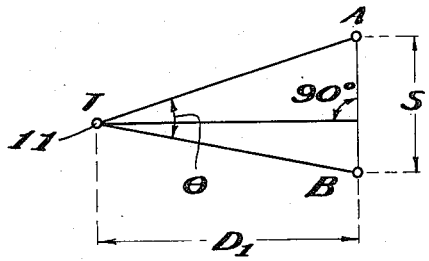
Figure 3 is a diagram illustrating the angular relationships.

With a plane flying at right angles to the transmitter the diagram of Figure 3 applies. It is seen that the antennae A and B are separated a distance S which is fixed and known. The transmitter 11 is at the vertex of an angle $\theta$. Since S is known and the angle $\theta$ may be obtained with the circuit of Figure 2, the distance D may be obtained from the Law of Sines. In practice the distance between pips A and B may be calibrated to read distance D.

Figure 4:
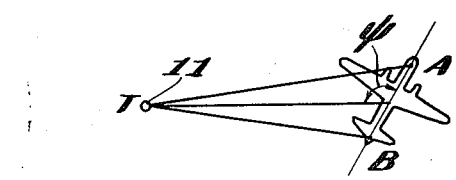
Figure 4 is a diagram illustrating the condition when the aircraft is displaced at an angle $\varphi$ from the transmitter.
Figure 5:
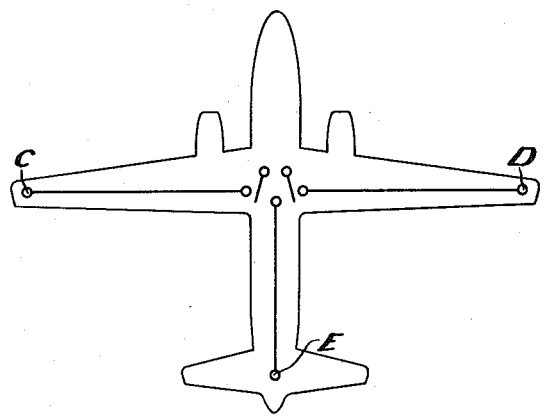
Figure 5 illustrates an aircraft with three antennas mounted thereon.

If the aircraft is not flying at a right angle to the transmitter 11 a further correction designated as the angle $\varphi$ in Figure 4 must be made to accurately solve the problem. Figure 5 illustrates an aircraft which has three antennas, C, D and E located respectively at opposite ends of the wing and near the tail. Suitable switches are available for connecting receivers 13 and 21 to any two of the antennas.

The rotating field produced by the transmitter 11 produces approximately 30 per cent modulation at a 30 cycle rate. The phase angle between the inputs received at the antennae A and B is equal to the angle $\theta$. In practice $\theta$ will be very small and the relationship sin $\theta = \theta$ will hold.

An example at the limiting conditions may be considered when the distance to the transmitter is 100 miles and the antennae A and B are spaced 20 feet apart.

$$\theta = \frac{S}{D} \times \frac{180}{\pi} \text{ degrees (spatial)}$$

If $\phi$ is designated as the phase difference between waves received at points A and B, then $\phi$ will equal $\theta$ electrical degrees. Substituting in these equations the above limiting conditions:

$$\phi = \frac{20}{528,000} \times \frac{180}{\pi} \text{ or } 0.00218 \text{ degree}$$

The distance between the pips A and B appearing on the oscilloscope 19 is a measure of this small phase angle. The angle may be changed to a time base from the relationship:

$$T = \frac{\phi(10^6)}{360f} \text{ microseconds}$$

$$T = \frac{0.00218 \times 10^6}{360 \times 30} = 0.203 \text{ microsecond}$$

Since it is virtually impossible to construct two systems each having a phase shift within the limits demanded, a calibration is required. This may be done electrically by switching both receivers 13 and 21 to one antenna as, for example, A and adjusting a phase shift network until the pips A and B coincide. Then the receivers 13 and 21 may be connected respectively to the antennae A and B.

In order to increase the time at 100 miles the 30 cycle frequency may be successively multiplied in the receivers to 810 cycles for example, and the time between pips A and B in the above example would then become 5.48 microseconds.

Another example might be considered when D is in the order of 10 miles. The pulse spacing then becomes 2.03 microseconds at 30 cycles or 54.8 microseconds at 810 cycles.

Since in general the aircraft will be flying at an angle $\varphi$, $\phi$ actual may be computed the $\phi$ indicated from the relationship:

$$\phi \text{ actual} = \frac{\phi \text{ indicated}}{\sin \psi}$$

The corrections may be made automatically by a suitable synchro computing system receiving information of the ship's heading relative to the omni-transmitter.

Since in many cases the angle $\varphi$ becomes large it would be advantageous to mount three antennae on the aircraft, as for example, one at either wing tip and one adjacent the tail, and switch means may be used to choose the two antennae which give the best results.

The clippers 16 and 23 are actuated on the steep front portion of the incoming sine waves so that greater accuracy may be obtained. If the peak of the sine waves were used the trigger results would be less accurate.

It is further pointed out that an advantage over the proposed CAA beacon responder DME system is that no time sharing problems occur in this system. The latter point is one of the more serious arguments against the present CAA plan.

Although this invention has been described with respect to particular embodiments thereof, it is not to be so limited as changes and modifications may be made therein which are within the full intended scope of the invention as defined by the appended claims.

I claim:

1. Apparatus for measuring distance from an omni-range transmitter by comparing the phase relationship between a pair of antennae separated by a base line comprising, a first antenna receiving radiant energy from said omni-range transmitter, a first receiver receiving an input from the first antenna and removing the modulation therefrom, a first clipper receiving the output of the first receiver to clip it on a steep portion of the receiver output, a pulse generator receiving the output of said clipper and producing a pulse, a second antenna receiving radiant energy from the omni-range transmitter, a second receiver receiving an input from the second antenna, a second clipper receiving the output of the second receiver and clipping it on a steep portion, a second pulse generator receiving the output of the second clipper and producing a pulse, and an oscilloscope receiving the outputs of the first and second pulse generators to produce a pair of pips separated on a time axis an amount proportional to the distance from the two antennae to the transmitting site.

2. Apparatus for measuring the distance to an omni-range transmitter from a moving body comprising, a pair of antennae mounted on said moving body and separated so as to have a base line therebetween, a first receiver connected to the first antenna, a first clipper receiving the output of the first receiver and clipping it on the positive-going half cycles, a first pulse generator receiving the output of the first clipper and producing a pulse corresponding to each cycle of the received modulation, a second receiver receiving an input from the second antenna, a second clipper receiving the output of the second receiver and clipping it on the positive-going half cycle, a second pulse generator receiving the output of the second clipper and producing a pulse corresponding to each cycle of the received modulation, a trigger receiving the output of the first and second pulse generators, and an oscilloscope receiving the output of the trigger to provide a pair of pips displaced on a time axis an amount proportional to the distance from the moving body to the transmitter.

3. Distance measuring apparatus for use with a transmitter which produces energy from which the angle relative to the transmitter may be determined comprising, a pair of antennae mounted on a moving body and separated by a base line, a pair of receivers receiving, respectively, the outputs of said antennae, a pair of clippers receiving, respectively, the outputs of the pair of receivers, a pair of pulse generators receiving, respectively, the output of the pair of clippers, a trigger receiving the outputs of the pair of pulse generators, and an oscilloscope receiving the output of the trigger so as to produce a pair of pips displaced on a time axis an amount proportional to the distance from the moving body to the transmitter.

References Cited in the file of this patent

UNITED STATES PATENTS

| | | |
|---|---|---|
| 2,403,429 | Anderson | July 9, 1946 |
| 2,403,626 | Wolff et al. | July 9, 1946 |
| 2,592,459 | Perilhou | Apr. 8, 1952 |
| 2,646,564 | Perilhou | July 21, 1953 |